(12) United States Patent
Gu et al.

(10) Patent No.: US 10,832,445 B2
(45) Date of Patent: Nov. 10, 2020

(54) METHOD, APPARATUS, TERMINAL AND SYSTEM FOR MEASURING TRAJECTORY TRACKING ACCURACY OF TARGET

(71) Applicant: BOE TECHNOLOGY GROUP CO., LTD., Beijing (CN)

(72) Inventors: Yu Gu, Beijing (CN); Xiaojun Tang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 290 days.

(21) Appl. No.: 15/966,345

(22) Filed: Apr. 30, 2018

(65) Prior Publication Data
US 2019/0066334 A1 Feb. 28, 2019

(30) Foreign Application Priority Data

Aug. 25, 2017 (CN) .......................... 2017 1 0741311

(51) Int. Cl.
*G06K 9/00* (2006.01)
*G06T 7/80* (2017.01)
(Continued)

(52) U.S. Cl.
CPC .................. *G06T 7/80* (2017.01); *G06T 7/20* (2013.01); *G06T 7/70* (2017.01);
(Continued)

(58) Field of Classification Search
CPC .... G06T 7/80; G06T 7/70; G06T 7/20; G06T 2207/10016; G06T 2207/10028; G06T 2207/302; G06T 2207/30241
See application file for complete search history.

(56) References Cited

U.S. PATENT DOCUMENTS 6,675,122 B1 * 1/2004 Markendorf ......... G01C 15/002
356/614
10,029,368 B2 * 7/2018 Wolowelsky ............. B25J 5/00
(Continued)

FOREIGN PATENT DOCUMENTS

| CN | 102699733 A | 10/2012 |
| CN | 103279642 A | 9/2013 |

(Continued)

OTHER PUBLICATIONS

First Office Action for Chinese Patent Application No. 201710741311.7 dated Jun. 25, 2019.
(Continued)

*Primary Examiner* — Shefali D Goradia
(74) *Attorney, Agent, or Firm* — Calfee, Halter & Griswold LLP

(57) ABSTRACT

Described herein are a method, apparatus, terminal, and system for measuring a trajectory tracking accuracy of a target. Using each method, apparatus, terminal, and system to measure the trajectory tracking accuracy of the target includes determining a location information of the actual tracking trajectory of the target; comparing the location information of the actual tracking trajectory with a location information of the target trajectory to determine a variance between the location information of the actual tracking trajectory and the location information of the target trajectory; and determining the tracking accuracy of the target based on the variance.

15 Claims, 3 Drawing Sheets

(51) Int. Cl.
*G06T 7/70* (2017.01)
*G06T 7/20* (2017.01)

(52) U.S. Cl.
CPC ............. *G06T 2207/10016* (2013.01); *G06T 2207/10028* (2013.01); *G06T 2207/30204* (2013.01); *G06T 2207/30241* (2013.01)

(56) References Cited

U.S. PATENT DOCUMENTS

| | | | |
|---|---|---|---|
| 10,335,947 B1* | 7/2019 | Diankov | B25J 9/1664 |
| 10,596,701 B1* | 3/2020 | Diankov | B25J 9/1664 |
| 10,607,182 B2* | 3/2020 | Shah | G06K 9/00664 |
| 2006/0241788 A1* | 10/2006 | Srinivasan | B25J 9/1694 |
| | | | 700/56 |
| 2009/0128647 A1* | 5/2009 | Fahn | G01S 3/7865 |
| | | | 348/221.1 |
| 2010/0020254 A1* | 1/2010 | Geng | G03B 21/006 |
| | | | 349/15 |
| 2014/0363048 A1* | 12/2014 | Vrcelj | G06K 9/78 |
| | | | 382/103 |
| 2015/0359512 A1* | 12/2015 | Boctor | G01S 15/8997 |
| | | | 600/444 |
| 2018/0053307 A1 | 2/2018 | Xiao | |
| 2018/0150972 A1* | 5/2018 | Zhu | G06T 7/74 |

FOREIGN PATENT DOCUMENTS

| | | |
|---|---|---|
| CN | 106127137 A | 11/2016 |
| CN | 106355604 A | 1/2017 |
| CN | 106443733 A | 2/2017 |
| CN | 106548475 A | 3/2017 |
| CN | 106950999 A | 7/2017 |
| CN | 107063304 A | 8/2017 |

OTHER PUBLICATIONS

Hezhen Qiu, et al., "Analysis on the influence of original position for a fully-actuated ship dynamic tracking ", The Ocean Engineering, vol. 33, No. 4, p. 86-93, Publication date: Jul. 30, 2015, Country of Publication: China, Publishing House: China Academic Journal Electronic Publishing House.

* cited by examiner

METHOD, APPARATUS, TERMINAL AND SYSTEM FOR MEASURING TRAJECTORY TRACKING ACCURACY OF TARGET

RELATED APPLICATIONS

The present application claims priority to Chinese Patent Application No. 201710741311.7 filed on Aug. 25, 2017, the entire contents of which are hereby incorporated by reference.

TECHNICAL FIELD

The present disclosure relates to the field of accuracy measurement. Specifically, the present disclosure relates to a method, an apparatus, a terminal and a system for measuring a trajectory tracking accuracy of a target.

BACKGROUND

Nowadays, people use the Internet in various aspects of daily life and work. Various intelligent products related to the Internet have also emerged. In particular, as one of the intelligent products, robots are often used in various industries because they can replace or assist humans so as to complete some tasks. A tracking robot is a robot that can track or follow a specific target within a specified range. A tracking robot can be a service robot, which for example can help people carry some heavy objects, or an entertainment robot, which for example can interact with people through tracking. At present, an evaluation factor of the tracking robot is the tracking accuracy.

SUMMARY

According to an embodiment of the present disclosure, there is provided a method for measuring a trajectory tracking accuracy of a target, including: determining a location information of the actual tracking trajectory of the target; comparing the location information of the actual tracking trajectory with a location information of a target trajectory, to determine a variance between the location information of the actual tracking trajectory and the location information of the target trajectory; and determining the tracking accuracy of the target based on the variance.

In some embodiments, determining the location information of the actual tracking trajectory of the target includes: acquiring an image data of the actual tracking trajectory of the target and determining the location information of the actual tracking trajectory of the target based on the image data.

In some embodiments, the method further comprises establishing a world coordinate system, a camera coordinate system and an image coordinate system, before determining the location information of the actual tracking trajectory of the target.

In some embodiments, determining the location information of the actual tracking trajectory of the target includes: determining a location parameter of the camera; and determining the location information of the actual tracking trajectory of the target in the world coordinate system, based on the location parameter.

In some embodiments, the location parameter includes an internal location parameter and an external location parameter, wherein the internal location parameter is an optical parameter of the camera, and the external location parameter is a conversion coefficient from the world coordinate system to the camera coordinate system.

In some embodiments, the optical parameter is the focal length of the camera and the optical center position of the camera.

In some embodiments, determining the location parameter of the camera comprises determining the location parameter of the target in the image coordinate system by using an image of the target captured by the camera in a tracking process.

In some embodiments, the location information of the actual tracking trajectory of the target is acquired according to the following formula:

$$\begin{bmatrix} u \\ v \\ 1 \end{bmatrix} = k \begin{bmatrix} fx & 0 & u0 & 0 \\ 0 & fy & v0 & 0 \\ 0 & 0 & 1 & 0 \end{bmatrix} \begin{bmatrix} R & T \\ 0 & 1 \end{bmatrix} \begin{bmatrix} X \\ Y \\ Z \\ 1 \end{bmatrix}$$

wherein R is the rotation matrix of the camera coordinate system with respect to the world coordinate system, T is the translation matrix of the camera coordinate system with respect to the world coordinate system, fx is the equivalent focal length along the $X_C$-axis of the camera, fy is the equivalent focal length along the $Y_C$-axis of the camera, the point (uo, vo) is the intersection of the optical axis of the camera and a two-dimensional plane where the image coordinate system is located, wherein uo is a coordinate value of the intersection on an x'-axis of the image coordinate system, and vo is a coordinate value of the intersection on a y'-axis of the image coordinate system, u is a coordinate value of the target on the x'-axis of the image coordinate system in the image of the target captured in the tracking process, v is a coordinate value of the target on the y'-axis of the image coordinate system in the image of the target captured in the tracking process, Z is a height of the target, and Z is a coordinate value of the target on a Z-axis of the world coordinate system, X is a coordinate value of the target on an X-axis of the world coordinate system, Y is a coordinate value of the target on a Y-axis of the world coordinate system, and k is the reciprocal of a coordinate value of the target on a $Z_C$-axis of the camera coordinate system.

In some embodiments, the determining the tracking accuracy of the target based on the variance comprises: selecting corresponding identification points of the actual tracking trajectory and the target trajectory, and calculating the variances between the corresponding identification points, wherein the corresponding identification points include the same components; calculating an average of the variances to determine a mean variance; and determining the tracking accuracy of the target by using the mean variance according to an accuracy rule.

In some embodiments, the mean variance is acquired from the following formula:

$$\text{error} = \frac{\sum_{i=1}^{i<N+1} \text{abs}(xi' - xi)}{N}$$

wherein error is the value of the mean variance, N is a number of identification points selected from the actual tracking trajectory or the target trajectory, xi' is a component of an identification point on the target trajectory apart from a same component, and xi is a component of the identification point on the actual tracking trajectory apart from the same component.

In some embodiments, an accuracy rule is expressed by the following formula:

$$accuracy = 1 - error$$

wherein, accuracy is the tracking accuracy of the target.

In some embodiments, the comparing the location information of the actual tracking trajectory with the location information of the target trajectory, to determine the variance between the location information of the actual tracking trajectory and the location information of the target trajectory includes: comparing the location information of an actual trajectory point on the actual tracking trajectory with the location information of a target trajectory point on the target trajectory closest to the actual trajectory point to determine the variance between the location information of the actual tracking trajectory and the location information of the target trajectory.

According to another embodiment of the present disclosure, there is provided an apparatus for measuring a trajectory tracking accuracy of a target. The apparatus comprises a location information determining module, a variance calculation module and an accuracy calculation module, wherein the location information determining module is configured to determine a location information of the actual tracking trajectory of the target; the variance calculation module is configured to compare the location information of the actual tracking trajectory with the location information of the target trajectory, to determine the variance between the location information of the actual tracking trajectory and a location information of the target trajectory, and the accuracy calculation module is configured to determine the tracking accuracy of the target based on the variance.

According to yet another embodiment of the present disclosure, there is provided a terminal for measuring a trajectory tracking accuracy of a target. The terminal includes a processor and a memory for storing a computer program, wherein the computer program, when executed by the processor, implements a method for measuring the trajectory tracking accuracy of the target according to any one of the embodiments of the present disclosure.

According to still another embodiment of the present disclosure, there is provided a system for measuring a trajectory tracking accuracy of a target. The system includes a camera and a terminal for measuring the trajectory tracking accuracy of the target according to embodiments of the present disclosure, wherein the camera and the terminal for measuring the trajectory tracking accuracy of the target cooperate with each other to determine the trajectory tracking accuracy.

In some embodiments, a light source is installed on the top of the target, and a camera identifies the location information of the actual tracking trajectory of the target by means of a light emitted by the light source.

In some embodiments, the target is a robot.

According to still another embodiment of the present disclosure, there is provided a non-transitory computer-readable storage medium having stored thereon a computer program that, when executed by a processor, implements a method for measuring the trajectory tracking accuracy of the target according to embodiments of the present disclosure.

According to still another embodiment of the present disclosure, there is provided a computer program product that implements a method of measuring the trajectory tracking accuracy of a target according to embodiments of the present disclosure when an instruction in the computer program product is executed by a processor.

Additional embodiments and advantages of the present disclosure will be set forth in part in the following description. These additional embodiments and advantages will be apparent from the following description, or may be understood by the practicing of the disclosure.

BRIEF DESCRIPTION OF THE DRAWINGS

The above and/or additional embodiments and advantages of the present disclosure will be apparent and easily understood from the following description of embodiments in conjunction with the accompanying drawings, in which.

DETAILED DESCRIPTION

Figure 1:
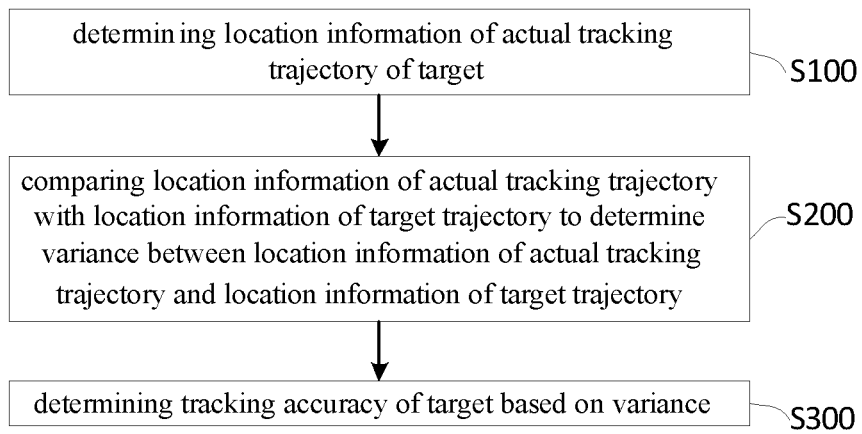
FIG. 1 is a flowchart of a method of measuring a trajectory tracking accuracy of a target according to embodiments of the present disclosure.

The embodiments of the present disclosure are described in detail below. Examples of the embodiments are shown in the drawings. In the drawings, the same or similar reference numerals denote the same or similar elements or elements having the same or similar functions throughout. The embodiments described below with reference to the drawings are exemplary. These examples are for illustrative purposes only and should not be construed as limiting the present disclosure.

Tracking accuracy is a factor for evaluating a tracking robot. Tracking accuracy is obtained by calculating or measuring the error between an actual tracking trajectory and a planned target trajectory of a robot. The target trajectory can be planned in advance. People can obtain the actual tracking trajectory by many methods. One method of obtaining the actual tracking trajectory is implemented by placing markers. Specifically, this method involves placing markers at intervals to identify the tracking trajectory of a robot while it is moving. However, in this process, people's subjective will may have an influence, resulting in a larger error of measurement. Another method is to place a wireless tag on the robot and install wireless modules, such as wireless local area networks, radio frequency identification (RFID), Bluetooth, Ultra-Wide Band (UWB), geomagnetism, etc., within a specified range. However, this method is expensive and acquisition of the actual tracking trajectory and determination of the tracking accuracy are relatively complicated. This also leads to a greater error in the tracking accuracy. Finding a low cost means to obtain a low-error actual tracking trajectory is an urgent problem.

The present disclosure provides a method for measuring a trajectory tracking accuracy of a target. The embodiments of the method are described in detail below with the aid of the drawings.

In an embodiment of a method, in order to measure the trajectory tracking accuracy of the target, a location information of the actual tracking trajectory of the target is determined (S100).

In order to determine the location information of the actual tracking trajectory of the target in a world coordinate system, it is required to acquire image data of the target on the actual tracking trajectory. Then the location information of the actual coordinate trajectory of the target in the world coordinate system is determined based on the image data.

In the tracking process of the target, a camera captures the images of the tracking process at a preset shooting frequency. Because the location of the target may change in the tracking process, the locations of the target in different images may also change. Captured images contain data for the target. Depending on the data of the target in the images, data of the camera, the relationship between a camera coordinate system and the world coordinate system, and the relationship between an image coordinate system and a camera coordinate system and/or the world coordinate system, it is possible to determine the tracking trajectory of the target in image by processing data of the target in the image. The actual tracking trajectory of the target in the tracking process may be acquired by converting the location of the target in the image to its location in the real world. That is, the location information of the actual tracking trajectory of the target in the world coordinate system may be acquired.

Figure 2:
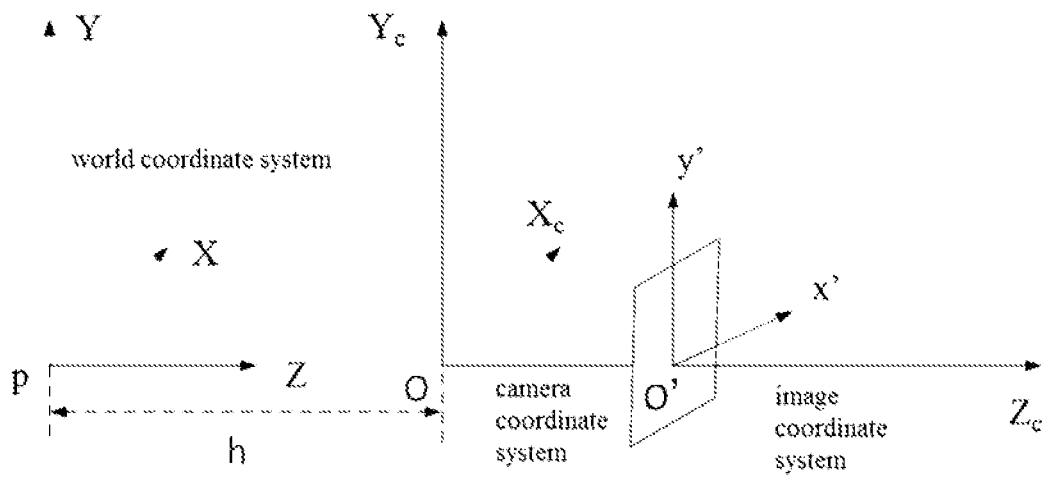
FIG. 2 is a schematic diagram of a conversion relationship between a world coordinate system, a camera coordinate system, and an image coordinate system according to an embodiment of the present disclosure.

To facilitate the conversion, the world coordinate system, the camera coordinate system, and the image coordinate system are established in advance. As shown in FIG. 2, the origin O of the world coordinate system is the center of a horizontal testing ground. The origin of the camera coordinate system is an optical center of the camera. An $X_C$-axis of the camera coordinate system is parallel to an x'-axis of an imaging plane coordinate system (i.e., image coordinate system). A $Y_C$-axis of the camera coordinate system is parallel to a y'-axis of the imaging plane coordinate system. An optical axis of the camera is perpendicular to the image plane formed by the imaging plane coordinate system. The intersection of the optical axis and the image plane is an origin O' of the imaging plane coordinate system. A Cartesian coordinate system described by a point O, the $X_C$-axis and the $Y_C$-axis is known as the camera coordinate system. OO' is a focal length of the camera. The image coordinate system is divided into an image pixel coordinate system and an image physical coordinate system. The origin of the image physical coordinate system is the intersection O' of the optical axis of a lens and the imaging plane, and the image physical coordinate system is a planar rectangular coordinate system. The image pixel coordinate system (i.e., the computer image (frame memory) coordinate system) is a plane rectangular coordinate system in pixels. The origin of the image pixel coordinate system is located at an upper left corner of the image in the image coordinate system when viewed from the camera to the image coordinate system. A u-axis of the image pixel coordinate system (not shown in the figure) is parallel to the x'-axis of the image physical coordinate system. A v-axis of the image pixel coordinate system (not shown in the figure) is parallel to the y'-axis of the image physical coordinate system. In FIG. 2, h is an object distance, which represents the distance between the world coordinate system and the camera coordinate system, i.e., a vertical distance from the contact point of the target with the ground to the camera.

Figure 3:
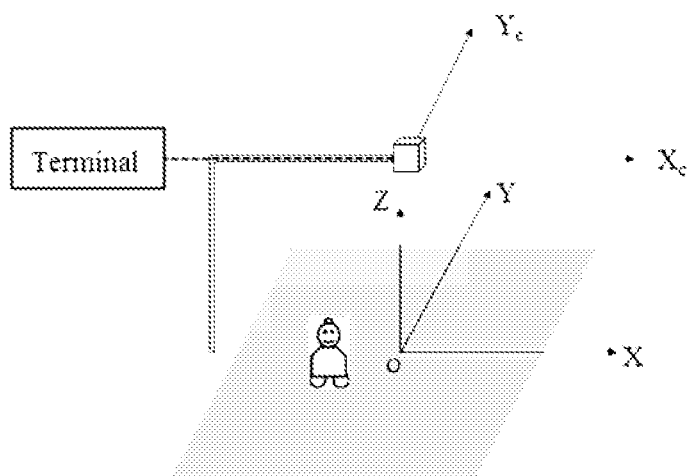
FIG. 3 is a schematic diagram of a system for measuring a trajectory tracking accuracy of a target according to an embodiment of the present disclosure, wherein an optical axis of a camera in the system is perpendicular to the ground and passes through an origin of a world coordinate system.

FIG. 3 schematically shows the arrangement of the system and the target. In FIG. 3, the origin of the world coordinate system is p. The $X_C$-axis of the camera coordinate system is parallel to the X-axis of the world coordinate system. The $Y_C$-axis of the camera coordinate system is parallel to the Y coordinate of the world coordinate system. The camera is any apparatus used to capture an image or a video, such as a video camera. The target is a robot. During the tracking process, the camera captures images of the robot. As mentioned earlier, the location of the robot may change, and therefore the location of the robot in the corresponding image also changes. By converting a location variation of the robot in the image, the variation of the actual location of the robot in the world coordinate system may be obtained, that is, the location information of the actual tracking trajectory of the robot in the world coordinate system is obtained. The specific conversion algorithm uses the following preset rules. For this purpose, it is required to acquire image data of the robot on the tracking trajectory in the image, for example, location data, pixel data, and the like. Then, by using data of the camera, the relationship between the camera coordinate system and the world coordinate system, and the relationship between the image coordinate system and the camera coordinate system and/or the world coordinate system to process the acquired data, the location information of the actual tracking trajectory of the robot in the world coordinate system can be acquired, so as to acquire the tracking trajectory of the robot in the real world.

Then, the location information of the actual tracking trajectory and the location information of the target trajectory are compared to determine the variance between the location information of the actual tracking trajectory and the location information of the target trajectory (S200).

As described above, the actual tracking trajectory of the target has been determined in step S100. The variance between the actual tracking trajectory of the target and a preset target trajectory of the target can be determined by comparing the actual tracking trajectory with the target trajectory of the target. Variance can be determined in real time, or it can be determined after the entire actual tracking trajectory is determined. The preset target trajectory is a trajectory planned before tracking. It can also be, after the target has tracked a section/point, a planned target trajectory of a next section/point to be tracked by the target. The planned target trajectory of the next section/point of the target may take time or distance as a node. The preset target trajectory of the next one or more sections/points of the target can be planned according to a variance of an adjacent previous one or more sections/points, or it can be planned according to an accuracy of the adjacent previous one or more sections/points of the target, or it can be planned according to the adjacent previous one or more sections/points itself of the target. The variance is determined in real time. Whenever the camera captures an image of the tracking trajectory of the target, the data in the image is acquired. In one embodiment, the location information of the actual tracking trajectory of the target is determined by step S100, and the location information of the actual tracking trajectory is compared with the location information of the target in the corresponding target trajectory to determine the variance of the target. In another embodiment, after the entire actual tracking of the target is completed, the image data in all pictures during the target tracking process captured by the camera is acquired, and then the actual tracking trajectory of the target (i.e. the location information of the actual tracking trajectory of the target) is acquired through step S100, and the location information of the actual tracking trajectory is compared with the location information of the target in the corresponding target trajectory to determine the variance of the target. In yet another embodiment, the image data in the image of the target during a section of tracking captured by the camera may be acquired after the target completes the section of tracking, and then the actual tracking trajectory of the target in the section of the tracking may be determined through step S100, and thus determine the location information of the actual tracking trajectory of the target, and compare the location information of the actual tracking trajectory with the location information of the target in the corresponding target trajectory to determine the variance between the actual tracking trajectory and the target trajectory. In yet another implementation, the image data in the image of the target in the tracking process captured by the camera may also be acquired according to the time period of the tracking process of the target, and then the actual tracking trajectory of the target within a period of time may be determined through the step S100, thus determining the location information of the actual tracking trajectory of the target, and comparing the location information of the actual tracking trajectory with the location information of the target in the corresponding target trajectory, to determine the variance of the tracking trajectory of the target during a period of time.

In an embodiment, as previously described, the target is a robot and the camera is a video camera. The camera captures the image of the robot in the tracking process. In step S100, the location information of the actual tracking trajectory of the robot is determined by acquiring the image data to determine actual tracking trajectory of the robot. Then the actual tracking trajectory of the robot is compared with a preset target trajectory to determine the trajectory variance of the robot in the tracking process. A specific comparison rule is described below. For example, if the variance of the robot is determined in real time, whenever the camera captures an image of the tracking trajectory of the robot, the data in this image is acquired. Then, the location information of the actual tracking trajectory of the robot is determined through step S100, and the location information of the actual tracking trajectory of the robot is compared with the location information of the robot in a corresponding preset target trajectory, to determine the location variance of the robot at a certain point. In another embodiment, if the actual tracking trajectory is compared with the preset target trajectory to determine variance after the robot completes the actual tracking (the specific preset target trajectory is described above), the camera captures multiple images of the robot, and the image data in the captured images (such as the data of the location of the robot in the image coordinate system) is acquired during the tracking process of the robot. The actual tracking trajectory of the robot is determined through step S100 to acquire the location information of the actual tracking trajectory of the robot, and the location information of the actual tracking trajectory of the robot is compared with the location information of the robot in the corresponding preset target trajectory to determine the variance of the tracking trajectory of the robot. In another embodiment, whenever the robot completes a section of the actual tracking, the camera captures an image of the robot in the section of the actual tracking. By acquiring the image data in the captured image of the robot in the section of the tracking and determining the location information of the actual tracking trajectory of the robot in the section of the tracking through step S100, and comparing the location information of the actual tracking trajectory with the location information of the robot in the corresponding preset target trajectory, the variance of the section of the tracking of the robot is determined. In another embodiment, the camera captures an image of the actual tracking process of the robot at intervals and the data in the image is acquired. By determining the location information of the actual tracking trajectory of the robot within that period of time through step S100, and comparing the location information of the actual tracking trajectory within the period of time with the location information of the corresponding preset target trajectory, the variance of the above two types of location information is determined. The determination of the variance of the tracking trajectory of the robot may comprise: firstly, completely determining the entire actual tracking trajectory of the robot, and then, determining the location variance of the robot through comparison. The determination of the variance of the tracking trajectory of the robot may include: whenever determining the location information of a certain point in the actual tracking trajectory of the robot, the variance of the point is determined by comparing the location information of that certain point with the location information of a corresponding point in a preset target trajectory. The determination of the location information of the actual tracking trajectory of the robot within a period of time or within a distance or a displacement of the robot may also include: determining the location information in the actual tracking trajectory of the robot within that period of time or within the distance or displacement of the robot, and from there determining the variance within that period of time or within the distance or displacement of the robot through the aforementioned steps.

Then, the tracking accuracy of the target according to the variance is determined (S300).

As described above, the location information of the actual tracking trajectory of the target is determined in step S100, and then the variance of the tracking trajectory of the target is determined through step S200. Then, according to the accuracy rule, the tracking accuracy of the target may be determined. Before determining the accuracy, the total variance of the actual tracking trajectory of the target and the preset target trajectory may be calculated, and the mean variance of the total variance can be determined. The total variance is the sum of all variances. The mean variance is determined by a mean rule. The accuracy indicates the proximity of the actual tracking trajectory of the target to the preset target trajectory. The smaller the mean variance, the greater the accuracy is, and the closer the actual tracking trajectory of the target is to the preset target trajectory. Specifically, as described above, the target is a robot, and the camera is a video camera. In step S100, the location information of the actual tracking trajectory of the robot is determined. After determining the variance of the tracking trajectory of the robot through step S200, all variances determined through step S200 are summed. Then the mean variance is determined with the mean rules. After that, the accuracy of the tracking of the robot is determined with the accuracy rule. The mean variance is denoted as M and accuracy as N. The smaller the M, the smaller the mean variance of the robot is. The accuracy N is inverse to the mean variance M. The smaller the M, the greater the accuracy N is. A larger accuracy N indicates that the actual tracking trajectory of the robot is closer to the preset target tracking trajectory, which indicates that the robot has a better trajectory tracking performance.

In an embodiment, determining the location information of the actual tracking trajectory of the target (S100) specifically includes: determining a location parameter of the camera (S110), and determining the location information of the actual tracking trajectory of the target in the world coordinate system based on the location parameter (S120). These steps are described in detail below.

Firstly, a location parameter of the camera is determined (S110).

Since the parameters of the camera do not change with the variation of the target being tracked, a location parameter of the camera can be determined by a first location parameter rule, after the camera is installed. The first location parameter rule is a calibration method of the camera. The calibration of the camera may include a variety of calibration methods. Specifically, considering whether a reference object is need, the calibration method can be divided into a conventional camera calibration method and a camera self-calibration method. The conventional camera calibration methods includes acquiring an internal location parameter and an external location parameter of the camera model by using a series of mathematical transformations and calculations method, by performing image processing based on specific experimental conditions (such as a known shape or size of a reference object) under certain camera models. The conventional camera calibration method includes a calibration method using the optimization algorithm, the calibration method using the camera perspective transformation matrix, the two-step method further including distortion compensation, and a bi-plane calibration method, which adopts a more reasonable camera model. The camera self-calibration method refers to a camera calibration method that does not depend on the reference object. It calibrates the camera simply using the correspondence between the images of the surrounding environment of the camera in the moving process. The camera self-calibration method is divided into: the camera self-calibration method based on automatic vision (i.e., the self-calibration method based on translational motion and rotational motion), the camera self-calibration method using an essential matrix and a basic matrix, the camera self-calibration method using a straight line correspondence between the multiple images, and the camera self-calibration method using a vanishing point and a weak perspective projection or parallel perspective projection. Considering the difference between the models used, the models of camera are divided into linear models and nonlinear models. The so-called linear model of the camera refers to the classical model of a small hole. The imaging process which does not obey the small hole model is known as the nonlinear model of the camera. The calibration of the camera of the linear model can be solved with a linear equation. Considering the difference of the number of cameras used in a vision system, the calibration can be divided into single camera system and multiple camera system. In a binocular stereo vision, the relative location and orientation between two cameras needs to be determined. Considering the results of solving parameters, calibration can be divided into explicit system and implicit system. The implicit parameter calibration uses a transformation matrix to represent a correspondence between space object points and two-dimensional image points, and uses transformation matrix elements as calibration parameters. A relative typical calibration is the direct linear transformation (DLT). DLT uses the most basic pinhole imaging model as its basis, and uses a 3×4 matrix to represent the direct correspondence between the space object points and the two-dimensional image points. It implements the explicit parameter calibration by accurately analyzing an intermediate process of camera imaging, constructing a precise geometric model, setting parameters with physical meaning (the parameters generally include: lens distortion parameters, image center variance, frame memory scanning horizontal scale factor, and effective focal length variance), and determining these unknown parameters. Considering the solution method, the calibration can be divided into an analytical method, a neural network method and a genetic algorithm. There is a complex nonlinear relationship between the space points and image corresponding points. The analytical method includes: using world coordinates and corresponding image coordinates of sufficient points, determining an internal positioning parameter, an external location parameter, and distortion parameters of the camera by analytical formula, and then acquiring the world coordinates of the space point corresponding to the point in an image according to an acquired internal location parameter, external location parameter, and distortion coefficient. The neural network method uses image coordinate points and corresponding space points as input and output sample sets for training, so that the network achieves a given input-output mapping relationship. For image coordinate points not belonging to the sample set, the world coordinates of the appropriate space point can also be obtained. Considering the difference between the calibration blocks, the calibration can be divided into three-dimensional calibration and planar calibration. The calibration is performed by using a target the three-dimensional geometry of which has been previously determined. That is, under a certain camera model, based on specific experimental conditions (such as the known shape and size of the reference (i.e., the calibration object)), the internal location parameter and the external location parameter of the camera model are acquired by a series of mathematical transformation and calculation methods after performing image processing to the image of the reference. The planar template (as the calibration object) acquires the image of each viewpoint and extracts a grid corner points on the image, and determines a homography matrix through the correspondence of the grid corners between the planar template and the images. The planar template can be a cardboard board on which a checkerboard printed by a laser printer is added. The planar template pattern often uses rectangles and quadratic curves (e.g., circles and ellipses). Considering the calibration procedure, the calibration can be divided into two-step method, three-step method, four-step method and so on. Considering whether the internal location parameter is variable, the calibration can be divided into the calibration of the variable internal location parameter and the calibration of the constant internal location parameter. Considering the mode of motion of the camera, the calibration can be divided into a non-limited motion mode camera calibration and a limited motion mode camera calibration. According to a difference of motion of the camera, the latter can be divided into purely rotating calibration methods, orthogonal translational motion calibration methods, and the like. Regardless of the classification, the ultimate purpose of the calibration is to derive the parameters of the object to be identified from the image points, i.e., the camera's internal location parameter, external location parameter, or projection matrix. Further, the first location parameter rule is any one or more of the foregoing calibration methods of the camera.

Specifically, in an embodiment, the first location parameter rule is the checkerboard calibration algorithm by Zhang Zhengyou. The checkerboard calibration algorithm by Zhang Zhengyou takes multiple shots (three times or more) to a calibration board in different directions. Thereby, the internal location parameter and distortion factor of the camera are directly obtained without knowing the motion of the calibration board. The accuracy of this calibration method is higher than the self-calibration method and it does not require high-accuracy positioning instruments. The checkerboard calibration algorithm by Zhang Zhengyou may use two models. One model is a classic pinhole model that contains four coordinate systems. The other model is a distortion model. How to use the calibration algorithm to determine the location parameter of the camera is described in further detail below.

Then, based on the location parameter, the location information of the actual tracking trajectory of the target in the world coordinate system is determined (S120). As mentioned earlier, the parameters of the camera can be determined. At this time, the location information of the actual tracking trajectory of the target in the world coordinate system can be determined by a preset rule of the target. The location information of the robot in the world coordinate system determined through the preset rule is the world coordinate information of the robot. The specific determination method will be detailed later.

In some embodiments, the location parameter of the camera includes an internal location parameter and an external location parameter. The internal location parameter is an optical parameter of the camera. The external location parameter is a conversion coefficient from the world coordinate system to the camera coordinate system.

As mentioned earlier, the location parameter of camera can be determined by various methods. In an embodiment, the parameters of the camera are determined through the checkerboard calibration algorithm by Zhang Zhengyou.

The external location parameter of the camera determines the relative location relationship between the camera coordinates system and the world coordinate system. Pw represents the world coordinates, Pc represents the camera coordinates, and their relationship is described as:

$$Pc=RPw+T$$

wherein, $T=(Tx, Ty, Tz)$ is a translation vector, and $R=R(\alpha, \beta, \gamma)$ is a rotation matrix. The rotation angle around a $Z_C$-axis of the camera coordinate system is $\gamma$, the rotation angle around a $Y_C$-axis is $\beta$, and the rotation angle around an $X_C$-axis is $\alpha$. The 6 parameters $(\alpha, \beta, \gamma, Tx, Ty, Tz)$ are the external location parameter of the camera. Specifically, the 6 external location parameters include matrix and vector, respectively. Therefore, the 6 external location parameters can be decomposed into 12 parameters. Specifically, the translation vector $T=(Tx, Ty, Tz)$ can be decomposed into 3 parameters, and the rotation matrix $R=R(\alpha, \beta, \gamma)$ can be decomposed into 9 parameters.

The determination method of the external location parameter of the camera includes: making a center position of the checkerboard calibration plate align with the origin of the world coordinate system and placing the checkerboard calibration plate horizontally on the ground, with the side of the checkerboard parallel to the ground side. Six corner points on the checkerboard are selected and the world coordinates of the 6 corner points are recorded respectively. Then, a frame of image is acquired by the camera, and the pixel coordinates of the six corner points in the image are extracted. Using these 6 pairs of the coordinates, 12 external location parameters can be calculated. For accuracy, the checkerboard can be placed at different locations on the ground and the above processes repeated. The resulting external location parameter is then processed (averaged) to get a final result.

The determination method of the internal location parameter of the camera includes: determining a projection relationship of the camera from 3-dimensional space to 2-dimensional image. In an embodiment, the camera parameters include a focal length (fx, fy) and an optical center position (uo, vo). In the determination method of the internal location parameter of the camera, the camera calibration method can be used to calculate the focal length (fx, fy) and the optical center position (uo, vo) of the camera. For example, using the checkerboard calibration algorithm by Zhang Zhengyou as described above, an image with a checkerboard is placed in front of the camera and at least 3 images with different angles and locations are taken (the image is called a camera calibration image). Then, the calibration algorithm by Zhang Zhengyou is used to process the camera calibration image to automatically calculate the internal location parameter of the camera.

In some embodiments, the optical parameters are a focal length and an optical center position of the camera.

As mentioned earlier, the specific focal length of the camera is (fx, fy), and the optical center position of the camera is (uo, vo). These optical parameters can be determined by the method described above, such as the previous checkerboard calibration method by Zhang Zhengyou. Determining these optical parameters can be used to determine the location information of the actual tracking trajectory of the target. In an embodiment, the target may be the robot as described above.

The determination of the location parameter of the camera (S110) specifically includes: determining the location parameter of the target in the image coordinate system by using the image of the target captured by the camera in the tracking process (S111).

In order to more accurately determine the location information of the actual tracking trajectory of the target, it also needs to determine the location information of the target in the image. The location information is mainly the location information (u,v) of the target in the image coordinate system and the location parameter of the target in the image coordinate system. The specific image is the image of the target in the tracking process captured by the aforementioned camera. The second location parameter rule may be any one or more of the Camshift (Continuously Adaptive Mean Shift) algorithm, the Kalman Filtering algorithm, the Meanshift algorithm, the particle filtering algorithm, and the like. By using the second location parameter rule, the robot can be tracked. In addition, the second location parameter rule may also be done by brightness detection, which involves determining the location of the target in the image by detecting the brightness of each frame of the image obtained by the camera. By using the second location parameter rule, the effective location of the target in the image can be determined. A light source is installed on the target. It can be recognized by the camera. The camera identifies the location information of the actual tracking trajectory of the target by the light emitted by the light source. The light source is an LED lamp installed on the top of the robot as described later. The light source can implement the tracking robustly.

Specifically, "robustness" means that a control system can maintain its performances under a perturbation of certain parameters (e.g., structure, size). According to different definitions of performance, the robustness can be divided into stability robustness and performance robustness. A fixed controller that is designed for the purpose of the robustness of a closed-loop system is called a robustness controller. The CamShift algorithm is a mean shift-based algorithm. The theoretical basis of the mean shift is probability density estimation. The process of the mean shift includes finding the local maximum points in the probability density space. Known from its full name, the basis of the CamShift algorithm is actually the MeanShift algorithm. The operating process of the mean shift may include the following steps: (a) calculating a mean shift vector mG(x0) corresponding to a certain kernel window centered on the initial point x0; (b) moving the center location of the kernel window according to mG(x0), i.e., assigning the weighted mean part of mG(x0) to x0 and making x0 as the new initial point, and then returning to step (a); and, (c) repeating the processes of (a) and (b) until certain predetermined condition is met. Therefore, the mean shift process is a process of finding the densest place in the data distribution. The implementing process of the mean shift may include: (1) calculating the mean of the target area, and if there is a shift vector, then shifting the target area; (2) recalculating the mean of the target area, and if there is still a shift vector, then continuing to shift the target area; (3) gradually making the shifting vector smaller; (4) when the local maximum point is found, no longer shifting the target area. The above processes are just the MeanShift algorithm process being performed once. The process of using the MeanShift algorithm on successive frames is the CamShift tracking algorithm. The basic idea of the CamShift algorithm is the same as the classic mean shift tracking algorithm. The difference is that the CamShift algorithm is established based on the color probability distribution maps and matrices. CamShift is highly robust to the tracking of targets in the indoor environment. Kalman filtering is an algorithm that uses linear system state formula to observe data through system input and output to make an optimal estimation of system state. Since the observation data is affected by noise and interference in the system, the optimal estimation process can also be seen as a filtering process. Data filtering is a data processing technique used to remove noise to restore real data. When the measurement variance is known, Kalman filtering can estimate the state of the dynamic system from a series of data with measured noise. It is easy to be implemented through computer programming and can update and process the data collected in the field in real time. There are many variations of the particle filtering tracking algorithms. An example is the most basic particle filtering algorithm implemented by Rob Hess. Its core idea is random sampling and re-sampling according to importance. Without knowing where the target is, particles are randomly distributed into the scene. After distributing the particles, the importance of each particle is calculated based on the similarity of the features. Then more particles are distributed in the important places, and less particles in the less important places. Therefore, compared to Monte Carlo filtering, the particle filtering has a smaller amount of calculation. Although this idea is relatively simple, the effect is usually better. The tracking of the target through particle filtering usually includes the following four steps. (1) Initialization phase—extracts the characteristics of the tracking target. In this stage, it is required to manually specify the tracking target and use the program to calculate the characteristics of the tracking target, such as the color feature of the target. Initially, a color sample is given to achieve a semi-automatic initialization of the program. Then, histogram of Hue space in the area, i.e., the feature of the target, is calculated. The histogram can be represented by a vector. So, the target feature is a vector V of N*1. (2) Search phase—distribute search particles. After acquiring the target feature, many search particles are distributed in the scene to search for the target object. The particle distribution includes the following manners. a) a uniform distribution. That is, uniformly distribute particles throughout the image plane. b) distribute particles in a Gaussian distribution near the target obtained in the previous frame. Distribute more particles at the place near the target and less particles away from the target. After distributing the particles, the color feature of the image at the location where it is located is calculated according to the target feature (i.e., the hue histogram, vector V) obtained in the initialization stage to obtain a hue histogram, the vector Vi, and calculate the similarity between that histogram and the target histogram (histogram matching). The similarity has multiple measures. The simplest measure is sum(abs (Vi−V)). After the similarity of each particle is calculated, normalization is performed so that the similarities of all particles add up to one. (3) decision phase—each distributed particle will report the image information of its location. (4) re-sampling phase. In a new frame of image, in order to search for the new location of the target, the particles need to be distributed again to conduct searching. Then, re-sampling is performed according to importance to redistribute particles in the place of great importance. After that, steps (2), (3), and (4) are repeated to complete the dynamic tracking of the target. The particle filtering tracking algorithm can be used in the field of video monitoring and can track the tracking targets with a higher speed. When the tracking algorithm is not applicable, brightness detection can be performed on each acquired frame of image, to obtain the location (u, v) of the target in the image. The specific aforementioned target is the robot.

In some embodiments, the location information of the actual tracking trajectory of the target is obtained by the following formula:

$$\begin{bmatrix} u \\ v \\ 1 \end{bmatrix} = k \begin{bmatrix} fx & 0 & u0 & 0 \\ 0 & fy & v0 & 0 \\ 0 & 0 & 1 & 0 \end{bmatrix} \begin{bmatrix} R & T \\ 0 & 1 \end{bmatrix} \begin{bmatrix} X \\ Y \\ Z \\ 1 \end{bmatrix}$$

wherein R is the rotation matrix of the camera coordinate system with respect to the world coordinate system, T is the translation matrix of the camera coordinate system with respect to the world coordinate system, fx is the equivalent focal length along the $X_C$-axis of the camera, fy is the equivalent focal length along the $Y_C$-axis of the camera, uo, vo is the intersection of the optical axis of the camera and the two-dimensional plane where the image coordinate system is located, wherein uo is the coordinate value of the intersection on the x'-axis of the image coordinate system, and vo is the coordinate value of the intersection on the y'-axis of the image coordinate system, u is the coordinate value of the target on the x'-axis of the image coordinate system in the image of the target captured in the tracking process, v is the coordinate value of the target on the y'-axis of the image coordinate system in the image of the target captured in the tracking process, Z is the height of the target, and Z is the coordinate value of the target on the Z-axis of the world coordinate system, X is the coordinate value of the target on the X-axis of the world coordinate system, Y is the coordinate value of the target on the Y-axis of the world coordinate system, and k is the reciprocal of the coordinate value of the target on the $Z_C$-axis of the camera coordinate system.

In one embodiment, the camera is a video camera and the target is a robot. By using different methods, the internal location parameter and the external location parameter of the camera and the location (u, v) of the target in the image coordinate system can be determined. In addition, Z is the coordinate of the robot on the Z-axis of the world coordinate system, i.e. the height of the robot, which can be determined by a simple measurement. Specifically, the internal location parameters of the camera may be the aforementioned fx, fy, uo, vo, and the external location parameter may be [R, T], respectively. R is the aforementioned rotation matrix. T is the aforementioned translation matrix and it can also be a translation vector. X and Y are the location information of the actual tracking trajectory of the robot in the actual coordinate system. It is an unknown parameter. Using the aforementioned fx, fy, uo, vo, [R, T], Z and preset rules, the specific values of X and Y can be determined, thereby the specific location information of the specific robot can be determined. uo and vo are the positions of optical center of the camera.

In another embodiment, as described above, the translation vector T=(Tx, Ty, Tz) is decomposed into three parameters, and the rotation matrix R=R($\alpha$, $\beta$, $\gamma$) can be decomposed into 9 parameters. $\alpha$ is also called as pitch angle, $\beta$ is also called as yaw angle, and $\gamma$ is also called as roll angle. To simplify the calculation, during the installation of the test device, it is ensured that the pitch angle $\alpha$, yaw angle $\beta$, and roll angle $\gamma$ of the camera are all 0, and the optical axis of the camera is perpendicular to the ground and passes through the origin of the world coordinate system. The conversion relationship between image coordinate system (u,v,1) and world coordinate system (x,y,z) is shown as follows:

$$\begin{bmatrix} u \\ v \\ 1 \end{bmatrix} = k \begin{bmatrix} fx & 0 & c_u \\ 0 & fy & c_v \\ 0 & 0 & 1 \end{bmatrix} \begin{bmatrix} X \\ Y \\ h \end{bmatrix}$$

therefore, the relationship between the coordinates of the robot in the world coordinate system and its image coordinates is:

$$\begin{cases} X = \dfrac{(u - u_0) * h}{f_x} \\ Y = \dfrac{(v - v_0) * h}{f_y} \end{cases}$$

wherein h represents the height of the robot and its value is equal to Z.

Figure 4:
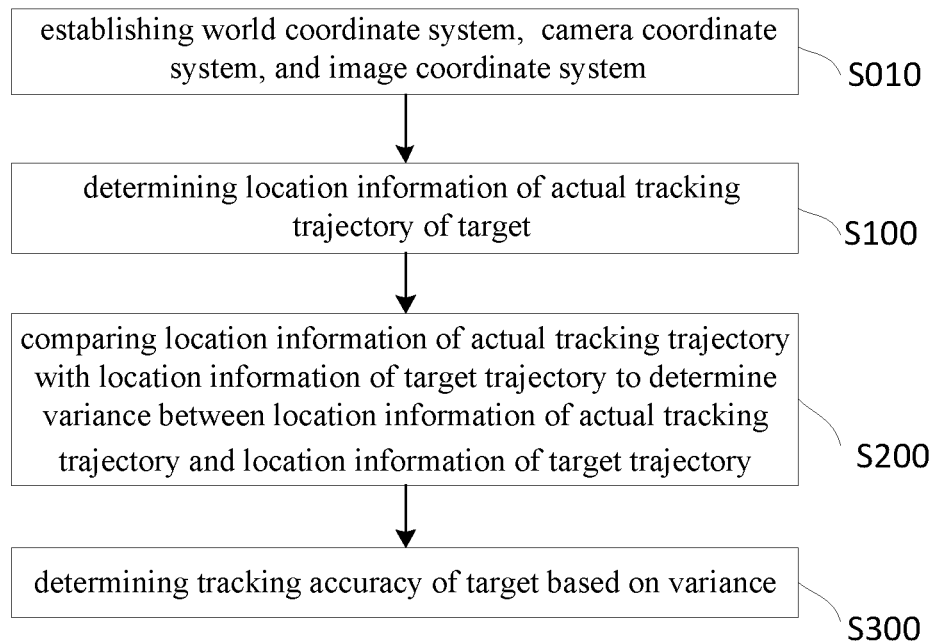
FIG. 4 is a flowchart of a method of measuring a trajectory tracking accuracy of a target according to embodiments of the present disclosure.

In another embodiment, as described in FIG. 4, the method further includes:

establishing a world coordinate system, a camera coordinate system, and an image coordinate system (S010).

By establishing the world coordinate system, the camera coordinate system, and the image coordinate system, specific location information of the target in different coordinate systems can be determined, and the aforementioned preset rules can be applied to determine the location information of the target in the actual coordinate system.

In addition, determining the tracking accuracy of the target according to the variance (S300) may specifically include: selecting corresponding identification points in the actual tracking trajectory and the target trajectory, and calculating the variance between the identification points, wherein the corresponding identification points have the same components; calculating the average of the variance to determine the mean variance; and, determine the tracking accuracy of the target by using the mean variance according to the accuracy rule.

Firstly, the corresponding identification points is selected from the actual tracking trajectory and the target trajectory, and the variance between the identification points is calculated, wherein the corresponding identification points have the same component. The identification information is a mapping of the variance. As mentioned earlier, after determining the variance, it is required to perform subsequent processing on the variance. In order to ensure that the location information of the actual tracking trajectory of the target corresponding to variance in the world coordinate system has a one-to-one correspondence with the location information of the preset target trajectory, the variance is identified. The identification method may include: combining the variance with location information, or labeling the variance. The correspondence between the variance and the identification is described as follows:

|  | identification | | | | |
| --- | --- | --- | --- | --- | --- |
|  | y1 | y2 | y3 | y4 | ... |
| variance | \|x1' − x1\| | \|x2' − x2\| | \|x3' − x3\| | \|x4' − x4\| | ... |

Specifically, the camera is a video camera, and target is a robot. According to the above table and in conjunction with FIG. 5, the robot performs tracking according to a preset trajectory. The target trajectory is shown as the solid line in FIG. 5, which consists of a straight line and a curved line. Through the foregoing steps, the location information of the actual tracking trajectory of the robot, i.e. the actual location coordinate of the robot in the world coordinate system can be determined and marked in FIG. 5. The actual y coordinate point of the robot is extracted and y is used as the identification information of variance. Taking the point (x1, y1) as an example, the intersection point (x1', y1) of the line y=y1 and the target curve is obtained based on the y1 value. The variance of this point is |x1'−x1|. The variance calculation is conducted to the acquired points and it is stored in the table above for subsequent processing. As can be seen from the above table, the identification refers to the y value of the robot on the preset target trajectory and actual tracking trajectory. The variance refers to the variance of the x values on the corresponding preset target trajectory and the actual tracking trajectory under the same y value, that is, the value of [x1'−x1].

Then the average of the variances is calculated to determine the mean variance (S320).

Due to the amount of the variances is large, all variances need to be averaged to determine the mean variance. The mean variance indicates the centralized tendency of variance data. The mean variance can be determined according to the least squares criterion. The mean variance can also be determined by summing each individual variance value and divide the result by the number of measurements. The specific processing rules of the mean variance are detailed later.

Subsequently, the tracking accuracy of the target is determined by using the mean variance according to the accuracy rule.

Since the mean variance reflects the centralized tendency of variance data, the difference between the variance domain and the average reflects the level of accuracy. The level of accuracy depends on the random error, which is usually measured by the variance. The smaller the mean variance, the greater the accuracy is, which indicates that the tracking accuracy of the target is better. Specific accuracy rules are detailed later.

In some embodiments, the mean variance is obtained by the following mean formula:

$$error = \frac{\sum_{i=1}^{i<N+1} abs(xi' - xi)}{N}$$

wherein error is the value of the mean variance, N is the number of identification points selected from the actual tracking trajectory or the target trajectory, xi' is a component of the identification point on the target trajectory apart from the same component, and xi is a component of the identification point on the actual tracking trajectory apart from the same component.

The accuracy rule is described by the following formula:

$$accuracy = 1 - error$$

wherein accuracy is the tracking accuracy of the target.

When the target is a robot, xi' is the location information of the target trajectory of the robot, and xi is the location information of the actual tracking trajectory of the robot. xi' and xi are the location information of a certain point where the robot is located. In the case of the same y value, abs(xi'−xi) is the absolute value of the location variance of the robot. The mean variance of the robot can be obtained by summing the multiple abs(xi'−xi) and dividing the sum by the number of the identification points on the actual tracking trajectory or the target trajectory. As mentioned earlier, the difference between the variance domain and the average reflects the level of accuracy. The range of variance is less than 1. Error reflects the accuracy of the tracking trajectory of the robot.

In some embodiments, the location information of the target trajectory and the location information of the actual tracking trajectory have the same identifier, so as to determine the variance of both by the comparison rules. Specifically, as described earlier, when the y values are the same, the variance between the x values corresponding to the same y value is found. At this time, the y value is the same identifier for the location information of the target trajectory and the location information of the actual tracking trajectory. In the same way, the x value may be set as the identifier and the variance between the y values corresponding to the same x value is found. At this time, the x value is the same identifier of the location information of the target trajectory and the location information of the actual tracking trajectory. The calculating process of the x value is the same as the y value, and therefore the procedure for finding the variance of the x value is the same. In the entire trajectory of actual tracking trajectory and preset target trajectory, when the y value is the same, the y value is considered as the identifier, and when the x value is the same, the x value is considered as the identifier to jointly determine the variance.

The step of comparing the location information of the actual tracking trajectory with the location information of the target trajectory, to determine the variance between the location information of the actual tracking trajectory and the location information of the target trajectory (S200) may include: comparing the location information of the actual trajectory point on the actual tracking trajectory with the location information of the target trajectory point on the target trajectory closest to the actual trajectory point, to determine the variance between the location information of the actual tracking trajectory and the location information of the target trajectory. This step may include: determining the distances between the actual trajectory point and at least two of the preset trajectory points on the preset target trajectory; comparing the distances to determine the preset trajectory point closest to the actual trajectory point; and comparing the location information of the actual trajectory point with the location information of the closest preset trajectory point, to determine the variance between the location information of the actual trajectory point and the location information of the closest preset trajectory point.

As described above, the variance between the location information of the actual tracking trajectory and the location information of the target trajectory may be determined by the same identifier. Specifically, when the same identifier of the location information of the actual tracking trajectory and the location information of the target trajectory cannot be determined, the preset trajectory point on the preset target trajectory closest to the actual trajectory point is acquired. Before determining the closest preset trajectory point, the distance between the actual trajectory point and a plurality of preset trajectory points on the preset target trajectory needs to be determined. A specific determination method is: acquiring the distance between the actual trajectory point (x1, y1) and a plurality of preset trajectory points (x', y') by using the formula of $\sqrt{(x1-x')^2+(y1-y')^2}$ and determine the preset trajectory points closest to the actual trajectory point. The variance between the location information of the actual tracking trajectory and the location information of the target trajectory is determined through the location information of the actual trajectory point and the location information of the preset trajectory point. For the same set of the actual tracking trajectory and the preset target trajectory, different identifiers can be used in different segments. For example, the y-value can be used as an identifier in one segment and the x-value is used as an identifier in another segment, and thus the variance between the location information of the actual tracking trajectory and the location information of the target trajectory is jointly determined.

Figure 5:
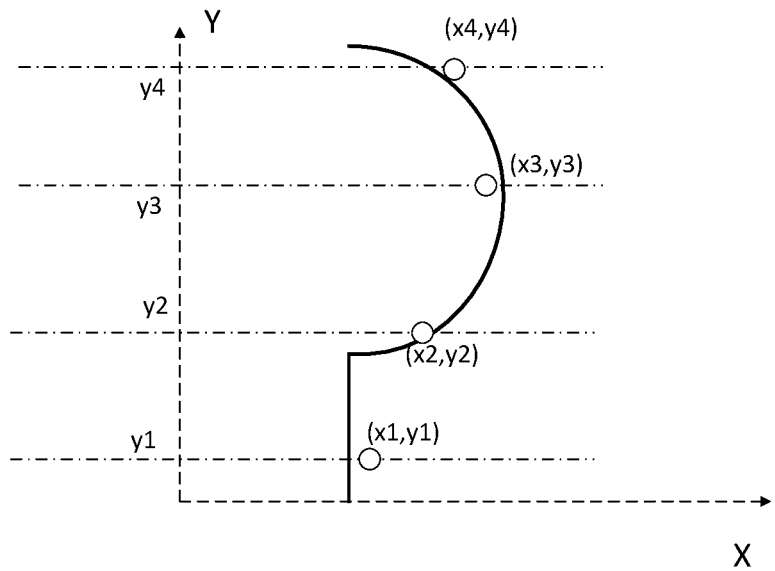
FIG. 5 is a schematic diagram of an actual tracking trajectory according to an embodiment of the present disclosure.

In the embodiment shown in FIG. 5, a section of the preset target trajectory is perpendicular to the x-axis. If the actual tracking trajectory and the preset target trajectory each have a corresponding trajectory section perpendicular to the x-axis, and the x value of the trajectory section of the actual tracking trajectory is not equal to the x value of the corresponding trajectory section of the preset target trajectory, then taking x as the identifier will not be able to determine the variance between the location information of the actual tracking trajectory and the location information of the target trajectory. In this case, firstly, acquire the location information of the actual trajectory point on the actual tracking trajectory and the location information of the plurality of preset trajectory points on the preset target trajectory. Then, according to the formula $\sqrt{(x1-x')^2+(y1-y')^2}$, determine the distance between the actual trajectory point (x1, y1) and the plurality of preset trajectory points (x', y') on the preset target trajectory. Then, the distances are compared. In this case, the shortest distance is the distance from the actual trajectory point to the preset trajectory point, i.e. the variance. The method of determining the variance between the location information of the trajectory section of the actual tracking trajectory and the location information of the trajectory section of the preset target trajectory having the same x identifier comprises: taking the absolute value of the variance of the y values of the location information of the actual tracking trajectory and the location information of the target trajectory having the same x identifier.

Figure 6:
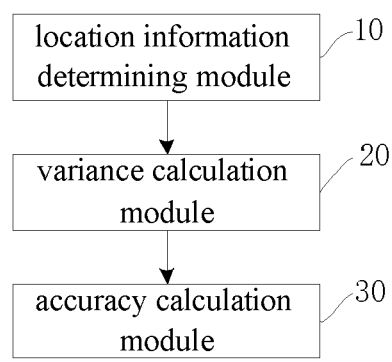
FIG. 6 is a schematic structural diagram of an apparatus for measuring a trajectory tracking accuracy of a target according to embodiments of the present disclosure.

The present disclosure also provides an apparatus for measuring a trajectory tracking accuracy of a target. The embodiment shown in FIG. 6 includes a location information determining module 10, a variance calculation module 20, and an accuracy calculation module 30. The location information determining module 10 is configured to determine the location information of the actual tracking trajectory of the target. After determining the location information, the information determining module 10 delivers this location information to the variance calculation module 20. The variance calculation module 20 is configured to compare the location information of the actual tracking trajectory with the location information of the target trajectory to determine the variance between the location information of the actual tracking trajectory and the location information of the target trajectory. The location information of the target trajectory is the location information on a preset target trajectory. Then the variance is delivered to the accuracy calculation module 30. The accuracy calculation module 30 is configured to determine a tracking accuracy of the target based on the variance.

In the present disclosure, various functions and steps may be in the form of the above-mentioned modules, or software and hardware elements. Generally, such modules include routines, programs, objects, elements, components, data structures, code block, library, API, function and so forth that perform particular tasks or implement particular abstract data types. The terms "module," and "component" as used herein generally represent software, firmware, hardware, or a combination thereof. The features of the techniques described herein are platform-independent, meaning that the techniques may be implemented on a variety of computing platforms having a variety of processors. The term "module" is meant to encompass individual or groups of executable files, data files, libraries, drivers, scripts, database records, etc.

In some embodiments, aspects of the modules may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

Figure 7:
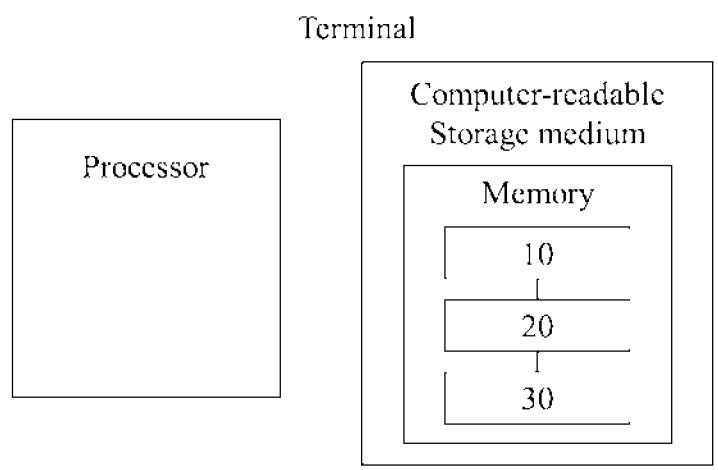
FIG. 7 is a schematic diagram of a terminal for measuring a trajectory tracking accuracy of a target according to embodiments of the present disclosure.

FIG. 7 schematically illustrates a terminal for measuring a trajectory tracking accuracy of a target according to the present disclosure. The terminal comprises a processor and a memory for storing a computer program. The computer program, when executed by the processor, implements the method for measuring the trajectory tracking accuracy of the target according to any one of the embodiments of the present disclosure.

The present disclosure further provides a system for measuring a trajectory tracking accuracy of a target, including a camera and the terminal for measuring the trajectory tracking accuracy of the target according to any one of the embodiments of the present disclosure. The camera and the terminal for measuring the trajectory tracking accuracy of the target cooperate with each other to determine the trajectory tracking accuracy.

The present disclosure further provides a non-transitory computer-readable storage medium having stored thereon a computer program that, when executed by a processor, implements the method for measuring the trajectory tracking accuracy of the target according to any one of the embodiments of the present disclosure. "Non-transitory computer-readable storage medium" refers to medium and/or devices that enable persistent storage of information and/or storage that is tangible, in contrast to mere signal transmission, carrier waves, or signals per se. Thus, computer-readable storage medium refers to non-signal bearing media. The computer-readable storage medium includes hardware such as volatile and non-volatile, removable and non-removable media and/or storage devices implemented in a method or technology suitable for storage of information such as computer readable instructions, data structures, program modules, logic elements/circuits, or other data. Examples of the computer-readable storage medium may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

The present disclosure further provides a computer program product that implements the method of measuring the trajectory tracking accuracy of the target according to any one of the embodiments of the present disclosure when an instruction in the computer program product is executed by a processor.

In one embodiment, a light source is installed at the top of the target. The camera identifies the location information of the actual tracking trajectory of the target through the light emitted by the light source. In an embodiment, the target may be a robot.

The method, apparatus, terminal and system for measuring a trajectory tracking accuracy of a target provided by the present disclosure are applicable to the measurement of trajectory tracking accuracy within a certain range. It can be used indoors or outdoors. The terminal and the camera in the system cooperate with each other to measure the trajectory tracking accuracy of the robot. The camera captures the image of the robot in the tracking process. The system terminal receives the image captured by the camera and extracts the location information of the robot in the image. In the case that the internal location parameter and the external location parameter of the robot have been determined, the location information of the actual tracking trajectory of the robot may be determined. The location information of the actual tracking trajectory is compared with the location information of the preset target trajectory of the robot according to the comparison rules, to determine the variance of the two. Then, sum the variances and divide the sum by the number of variances to determine the mean variance of the tracking trajectory of the robot. The accuracy of the tracking trajectory of the robot can be obtained by subtracting the mean variance from the maximum value of the variance value field (i.e. 1).

In order to determine the location information of the robot more effectively or determine the location information of the robot in more ways, a light source is installed on top of the robot. Specifically, the light source may be an LED lamp. It is mainly used to increase the brightness of the surroundings, so as to be easily recognized by the camera, or facilitate the identification of the location of the robot in the image by the algorithm of the terminal, thereby determine the location information of the actual tracking trajectory of the robot more accurately and effectively. The terminal and camera in the system can be in a physical structure, or they can be separate but connected to each other. The light source can also be an infrared light source. In this case, the robot can be identified by an infrared camera.

The method, apparatus, terminal and system for measuring a trajectory tracking accuracy of a target according to the present disclosure can determine the actual coordinates of the robot in the tracking process of the robot. The parameters involved can be determined during the installation of the camera. The calculation rules involved are simple, the memory occupied is small, and the consumption of the device is relatively low. Therefore, the service life of the apparatus, the terminal, and the system employing the method are relatively long.

The method, apparatus, terminal and system for measuring a trajectory tracking accuracy of a target according to the present disclosure may capture the images of the robot in the tracking process according to its own frequency. The capturing frequency of the camera can be automatically adjusted according to the route. It has a strong adjustability, and can obtain relatively more actual coordinates of the robot, thereby improve the accuracy. The number of modules involved is small, which effectively saves the cost of the accuracy measurement of the trace trajectory.

Each functional unit in each embodiment of the present disclosure may be integrated in one processing module, or each unit may exist alone physically, or two or more units may be integrated in one module. The above integrated module can be implemented in the form of hardware or in the form of a software function module. The integrated module can also be stored in a computer readable storage medium if it is implemented in the form of a software function module and sold or used as an independent product.

The above-mentioned storage medium may be a read-only memory, a magnetic disk or an optical disk, and the like.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware including several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

It should also be understood that, unless clearly indicated to the contrary, in any methods claimed herein that include more than one step or act, the order of the steps or acts of the method is not necessarily limited to the order in which the steps or acts of the method are recited. Also, any reference numerals or other characters appearing between parentheses in the claims are provided merely for convenience and are not intended to limit the claims in any way.

What is claimed is:

1. A method for measuring a trajectory tracking accuracy of a target, comprising:
    establishing a world coordinate system, a camera coordinate system and an image coordinate system;
    determining a location parameter of a camera; and
    determining a location information of an actual tracking trajectory of the target in the world coordinate system, based on the location parameter;
    comparing the location information of the actual tracking trajectory with a location information of a target trajectory to determine a variance between the location information of the actual tracking trajectory and the location information of the target trajectory; and
    determining the tracking accuracy of the target based on the variance;
    wherein the location parameter comprises an internal location parameter and an external location parameter, wherein the internal location parameter is an optical parameter of the camera, and the external location parameter is a conversion coefficient from the world coordinate system to the camera coordinate system.

2. The method for measuring the trajectory tracking accuracy of the target of claim 1, wherein determining the location information of the actual tracking trajectory of the target comprises:
    acquiring an image data of the actual tracking trajectory of the target, and determining the location information of the actual tracking trajectory of the target based on the image data.

3. The method for measuring the trajectory tracking accuracy of the target of claim 1, wherein the optical parameter comprises the focal length of the camera and the optical center position of the camera.

4. The method for measuring the trajectory tracking accuracy of the target of claim 1, wherein determining the location parameter of the camera comprises:
    determining the location parameter of the target in the image coordinate system by using an image of the target captured by the camera in a tracking process.

5. The method for measuring the trajectory tracking accuracy of the target of claim 1, wherein the location information of the actual tracking trajectory of the target is acquired according to the following formula:

$$\begin{bmatrix} u \\ v \\ 1 \end{bmatrix} = k \begin{bmatrix} fx & 0 & u0 & 0 \\ 0 & fy & v0 & 0 \\ 0 & 0 & 1 & 0 \end{bmatrix} \begin{bmatrix} R & T \\ 0 & 1 \end{bmatrix} \begin{bmatrix} X \\ Y \\ Z \\ 1 \end{bmatrix}$$

wherein R is a rotation matrix of the camera coordinate system with respect to the world coordinate system,
T is a translation matrix of the camera coordinate system with respect to the world coordinate system,
fx is an equivalent focal length along an XC-axis of the camera,
fy is an equivalent focal length along a YC-axis of the camera,
the point (uo, vo) is the intersection of an optical axis of the camera and a two-dimensional plane where the image coordinate system is located, wherein uo is a coordinate value of an intersection on an x'-axis of the image coordinate system, and vo is a coordinate value of an intersection on a y'-axis of the image coordinate system, u is a coordinate value of the target on the x'-axis of the image coordinate system in the image of the target captured in the tracking process, v is a coordinate value of the target on the y'-axis of the image coordinate system in the image of the target captured in the tracking process, Z is a height of the target, and Z is a coordinate value of the target on a Z-axis of the world coordinate system, X is a coordinate value of the target on an X-axis of the world coordinate system, Y is a coordinate value of the target on a Y-axis of the world coordinate system, and k is the reciprocal of a coordinate value of the target on a ZC-axis of the camera coordinate system.

6. The method for measuring the trajectory tracking accuracy of the target of claim 1, wherein said determining the tracking accuracy of the target based on the variance comprises:

selecting corresponding identification points in the actual tracking trajectory and the target trajectory, and calculating the variances between the corresponding identification points, wherein the corresponding identification points comprise the same components;

calculating an average of the variances to determine a mean variance; and determining the tracking accuracy of the target by using the mean variance according to an accuracy rule.

7. The method for measuring the trajectory tracking accuracy of the target of claim 6, wherein the mean variance is acquired from the following formula:

$$error = \frac{\sum_{i=1}^{i\leq N+1} abs(xi' - xi)}{N}$$

wherein error is the value of the mean variance,

N is a number of identification points selected from the actual tracking trajectory or the target trajectory, xi' is a component of the identification point on the target trajectory apart from the same component, and xi is a component of the identification point on the actual tracking trajectory apart from the same component.

8. The method for measuring the trajectory tracking accuracy of the target of claim 7, wherein the accuracy rule is expressed by the following formula:

accuracy=1−error wherein, accuracy is the tracking accuracy of the target.

9. The method for measuring the trajectory tracking accuracy of the target of claim 6, wherein said comparing the location information of the actual tracking trajectory with the location information of the target trajectory to determine the variance between the location information of the actual tracking trajectory and the location information of the target trajectory comprises:

comparing the location information of the actual trajectory point on the actual tracking trajectory with the location information of the target trajectory point on the target trajectory closest to the actual trajectory point, to determine the variance between the location information of the actual tracking trajectory and the location information of the target trajectory.

10. A non-transitory computer-readable storage medium having stored thereon a computer program that, when executed by a processor, implements the method for measuring the trajectory tracking accuracy of the target according to claim 1.

11. An apparatus for measuring a trajectory tracking accuracy of a target, comprising a location information determining module, a variance calculation module and an accuracy calculation module, wherein the location information determining module is configured to determine a location parameter of a camera and determine a location information of an actual tracking trajectory of the target in a world coordinate system based on the location parameter, wherein the location parameter comprises an internal location parameter and an external location parameter, wherein the internal location parameter is an optical parameter of the camera, and the external location parameter is a conversion coefficient from the world coordinate system to a camera coordinate system;

the variance calculation module is configured to compare the location information of the actual tracking trajectory with a location information of a target trajectory to determine the variance between the location information of the actual tracking trajectory and the location information of the target trajectory, and the accuracy calculation module is configured to determine a tracking accuracy of the target based on the variance.

12. A terminal for measuring a trajectory tracking accuracy of a target, comprising a processor and a memory for storing a computer program, wherein the computer program, when executed by the processor, implements a method for measuring a trajectory tracking accuracy of a target, comprising:

establishing a world coordinate system, a camera coordinate system and an image coordinate system;

determining a location parameter of a camera; and determining a location information of an actual tracking trajectory of the target in the world coordinate system, based on the location parameter;

comparing the location information of the actual tracking trajectory with a location information of a target trajectory to determine a variance between the location information of the actual tracking trajectory and the location information of the target trajectory; and determining the tracking accuracy of the target based on the variance;

wherein the location parameter comprises an internal location parameter and an external location parameter, wherein the internal location parameter is an optical parameter of the camera, and the external location parameter is a conversion coefficient from the world coordinate system to the camera coordinate system.

13. A system for measuring a trajectory tracking accuracy of a target, comprising a camera and the terminal for measuring the trajectory tracking accuracy of the target according to claim 12, wherein the camera and the terminal for measuring the trajectory tracking accuracy of the target cooperate to determine the trajectory tracking accuracy.

14. The system for measuring the trajectory tracking accuracy of the target of claim 13, wherein a light source is installed on the top of the target, and the camera identifies the location information of the actual tracking trajectory of the target by means of the light emitted by the light source.

15. The system for measuring the trajectory tracking accuracy of the target of claim 13, wherein the target is a robot.

* * * * *